(12) United States Patent
Frederiksen et al.

(10) Patent No.: US 12,281,738 B2
(45) Date of Patent: Apr. 22, 2025

(54) QUICK CONNECTOR WITH VERIFIER

(71) Applicant: COOPER-STANDARD AUTOMOTIVE INC, Northville, MI (US)

(72) Inventors: Stephen S. Frederiksen, Clarkston, MI (US); Kenneth J. Gocha, Flint, MI (US); Tisiphone A. Titus, Warren, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 384 days.

(21) Appl. No.: 17/867,374

(22) Filed: Jul. 18, 2022

(65) Prior Publication Data

US 2023/0055432 A1    Feb. 23, 2023

Related U.S. Application Data

(60) Provisional application No. 63/234,243, filed on Aug. 18, 2021.

(51) Int. Cl.
*F16L 37/12*   (2006.01)
*F16L 37/088*  (2006.01)

(52) U.S. Cl.
CPC ....... *F16L 37/1225* (2013.01); *F16L 37/0885* (2019.08); *F16L 2201/10* (2013.01)

(58) Field of Classification Search
CPC ............... F16L 2201/10; F16L 37/0885
See application file for complete search history.

(56) References Cited

U.S. PATENT DOCUMENTS

| | | | |
|---|---|---|---|
| 7,390,025 B2 * | 6/2008 | Pepe | F16L 37/0885 285/82 |
| 7,484,774 B2 | 2/2009 | Kerin et al. | |
| 9,016,729 B2 | 4/2015 | Ishida et al. | |
| 10,550,982 B2 | 2/2020 | Pepe et al. | |
| 10,816,121 B2 | 10/2020 | Kerin, Jr. | |
| 11,199,281 B2 | 12/2021 | Gauthier | |

(Continued)

FOREIGN PATENT DOCUMENTS

| | | |
|---|---|---|
| WO | 2010035755 A1 | 4/2010 |
| WO | 2020165625 A1 | 8/2020 |

OTHER PUBLICATIONS

Search Report for EP22190762.9 dated Jan. 5, 2023.
1 Search Report and Written Opinion for 24205277.7 dated Jan. 30, 2025.

*Primary Examiner* — James M Hewitt, II
(74) *Attorney, Agent, or Firm* — Paschall & Associates, LLC; James C. Paschall; Anthony Miologos

(57) ABSTRACT

A quick connector assembly coupling a fluid tube to a receptacle body includes a socket portion and a wall bordering a socket opening. A pair of latch openings extend through the wall into the socket opening. A bracket installed on the wall includes a pair of spring latches that reach through a respective one of the pair of latch openings into the socket opening. A fluid tube having a raised upset is placed through the socket opening causing the upset to be captured by each spring latch. A verifier having fixing fingers and a pair of verifier arms is installed through respective recesses in the wall and into the socket opening that causes each verifier arm to travel along the upset to rest below a respective spring latch and the fixing fingers to capture the upset.

18 Claims, 11 Drawing Sheets

(56) References Cited

U.S. PATENT DOCUMENTS

| | | | |
|---|---|---|---|
| 11,365,840 B2 | 6/2022 | Gauthier | |
| 2010/0032937 A1* | 2/2010 | Kerin | F16L 37/144 |
| | | | 285/3 |
| 2010/0052315 A1* | 3/2010 | Kerin | F16L 37/0885 |
| | | | 285/148.21 |
| 2010/0276924 A1* | 11/2010 | Gillet | F16L 37/0885 |
| | | | 285/93 |
| 2016/0069496 A1 | 3/2016 | Tayama et al. | |
| 2016/0201835 A1* | 7/2016 | Jones | F16L 37/144 |
| | | | 285/305 |
| 2022/0003347 A1 | 1/2022 | Barthel et al. | |
| 2023/0408012 A1* | 12/2023 | Sankar Narayanan | ................... |
| | | | F16L 37/0985 |

\* cited by examiner

QUICK CONNECTOR WITH VERIFIER

CROSS-REFERENCE TO RELATED APPLICATIONS

This application claims priority under 35 U.S.C. § 119(e) to U.S. Provisional Patent Application No. 63/234,243 filed on Aug. 18, 2021. This provisional application is hereby incorporated by reference in its entirety.

TECHNICAL FIELD

The field relates to fluid connectors. More particularly, this disclosure relates to a quick connector with a verifier that visually indicates a correct fluid connection.

BACKGROUND

Quick connectors find use in the automotive and other industries for coupling fluid piping. In such couplings, a tube is joined to another device such as a pump, tank, or another tube. The quick connector may have a tubular female receptacle body arranged to sealingly receive a male tube therein. The male tube may include an endform adapted to make a snap engagement with the female receptacle body and provide a locking relationship between the endform and the female receptacle body. Use of quick connectors is advantageous in that a sealed and secured fluid line may be established with a minimum amount of time and expense.

SUMMARY

A first embodiment of this disclosure provides a quick connector assembly that couples a fluid line between a first and a second fluid tube. The quick connector assembly comprises a receptacle body having a cavity extending through the receptacle body to a stem portion connected to the second fluid tube. A sealing section is located within the cavity and a socket portion extends from the sealing section. The socket portion includes a wall bordering a socket opening in alignment with the cavity. A pair of latch openings extend through a portion of the wall into the socket opening. A sealing member having a receiver opening is installed in the sealing section with the receiver opening in alignment with the socket opening and the stem portion. A bracket is installed on the wall and includes a pair of spring latches with each spring latch extending through a respective one of the pair of the latch openings into the socket opening. A first fluid tube having an insertion portion and a raised upset has the insertion portion placed through the socket opening into the receiver opening making a fluid connection to the second fluid tube and causing the upset to be captured by each spring latch retaining the first fluid tube to the receptacle body.

In a second embodiment a process for forming a coupling in a fluid line between a first and second fluid tube is disclosed. The process comprises, coupling the second fluid tube to a stem of a receptacle body that has a cavity extending through the receptacle body. A sealing member having a receiver opening in alignment with the socket opening and the stem portion is installed in a sealing section formed within the cavity. A socket portion extends from the sealing section that includes a wall bordering a socket opening in alignment with the receiver opening. A pair of latch openings extend through a portion of the wall into the socket opening and a bracket is installed on the wall that includes a pair of spring latches with each spring latch extending through a respective one of the pair of the latch openings into the socket opening. The process further includes forming an endform on the first fluid tube including an insertion portion and a raised upset and inserting the insertion portion through the socket opening into the receiver opening wherein the first fluid tube makes a fluid coupling to the second fluid tube and causing the upset to be captured by each spring latch and retaining the first fluid tube to the receptacle body.

A verifier is used in both the first and second embodiments to verify the coupling of the first fluid tube to the receptacle body. The verifier includes fixing fingers and a pair of arms. Each arm extends from either side of a push surface. The verifier arms and fixing fingers are installed through respective recesses in the wall into the socket opening. Upon capture of the first fluid tube upset by each of the spring latches, a force applied to the verifier push surface causes each verifier arm to travel along the sides of the first fluid tube upset to rest below a respective spring latch and the fixing fingers to capture the first fluid tube upset. Verifier symbols located on a surface on each verifier arm are visible through the latch openings verifying the coupling of the first fluid tube to the receptacle body.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
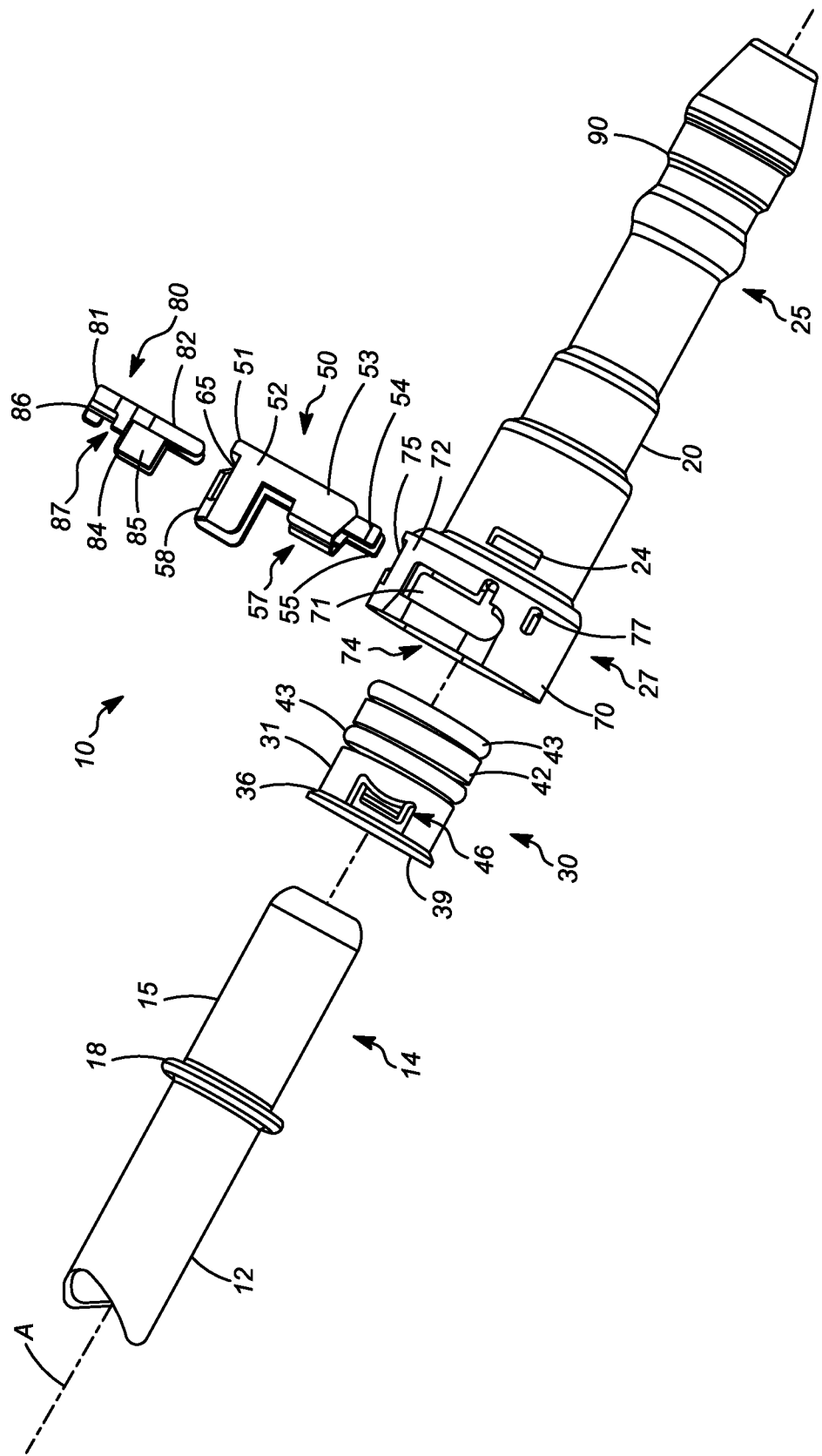
FIG. 1 illustrates an example exploded isometric view of an example quick connector in accordance with the present disclosure.

All figures serve illustrative purposes only and are not intended to limit the scope of the present invention. The drawings are generally to scale, but some features may not be true to scale and serve to emphasize certain details of the various aspects of the invention. Common items between different embodiments of the figures have common reference numerals. It should be noted that for purposes of clarity, the quick connector of the present disclosure is shown with its longitudinal extent position in a horizontal plane and the terms "top," "bottom," have been used in describing the connector body. However, in use, the quick connector coupling can reside in any orientation without regard to the horizontal and vertical planes and "top," "bottom," "sides," and "lateral" are thus used in relation to the figures and illustrations herein.

An exploded view of an example quick connector assembly 10 for coupling a fluid line to another fluid line, is illustrated in FIG. 1. As is shown in FIG. 1, the quick connector assembly 10 is used to form a fluid connection in a fluid line between a first fluid tube 12 and a second fluid tube (not shown) installed on a stem 25 of a receptacle body 20. The first fluid tube 12 may be a pipe, a hose, or any other fluid conveying component. The first fluid tube 12 includes an endform 14 of a tubular configuration arranged to be accepted within a complementary female socket portion 27 of the receptacle body 20 and along generally a longitudinal axis A about which the quick connector 10 is arranged. The endform 14 includes a cylindrical insertion portion 15 and a raised upset 18. The raised upset 18 extending circumferentially about the exterior of endform 14. The upset 18 may be formed integrally from the material of the endform 14 during its manufacture or may be a separate component bonded to the exterior of endform 14. The quick connector assembly 10 of the present disclosure further includes a sealing member 30, a bracket 50, and a verifier 80.

The receptacle body 20 is a tubular member defining a male end that forms the stem 25. Stem 25 extends axially from a female end or socket portion 27. The stem 25 generally includes various ribs, ridges, and grooves 90 for coupling to the interior cavity of the second fluid tube. The various ribs, ridges, and grooves 90 of stem 25 may take several configurations depending on the structure of the second fluid tube attached over stem 25. The socket portion 27 is structured for accepting therein a sealing member 30 through an internal cavity 29, shown on FIG. 2. The cavity 29 extends from the socket portion 27 through stem 25 and forms a portion of the fluid line. The quick connector 10 further includes a sealing member 30, a bracket 50, and a verifier 80.

Figure 2:
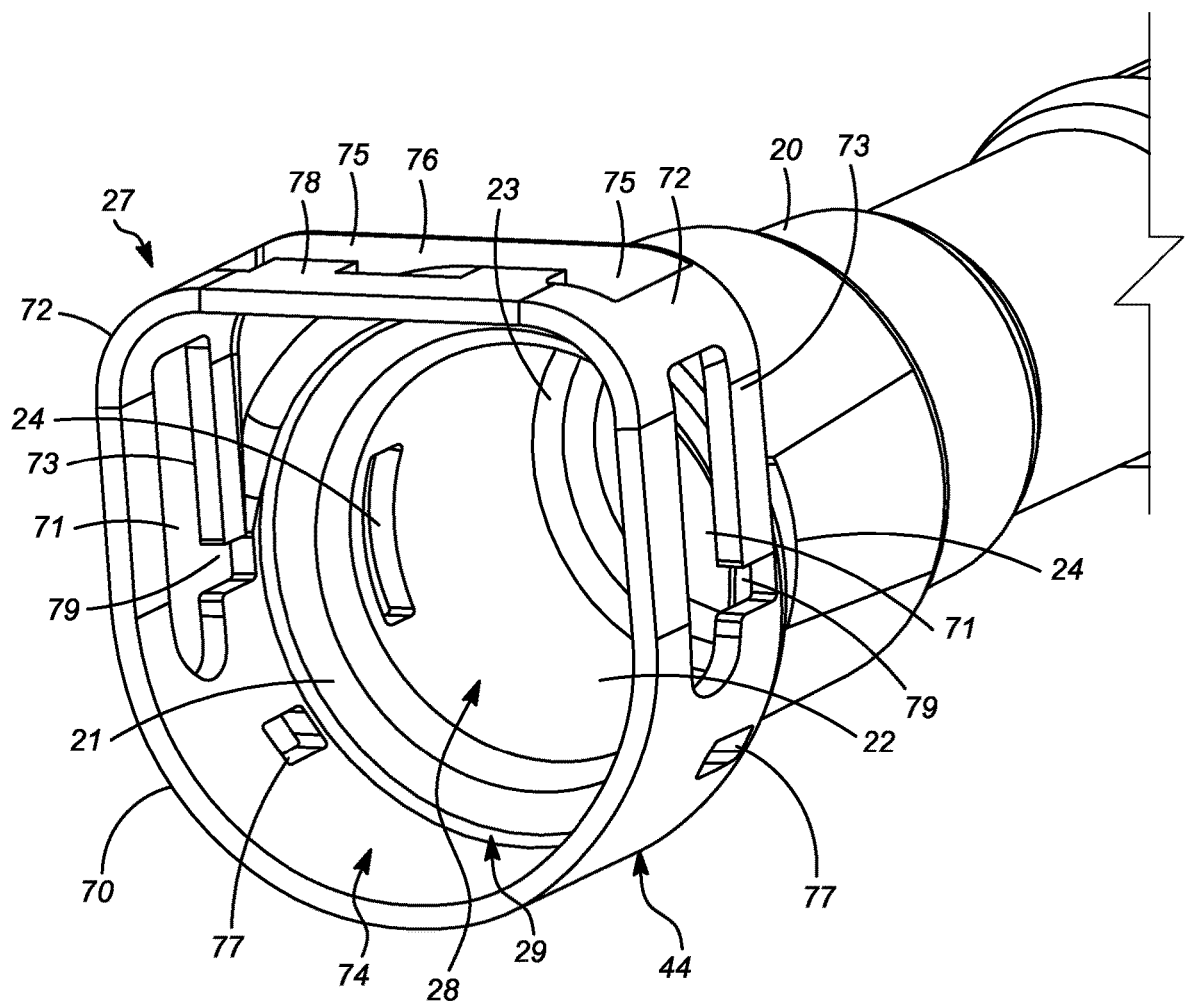
FIG. 2 illustrates an isometric view of a socket portion of the example quick connector in accordance with the present disclosure.
Figure 3:
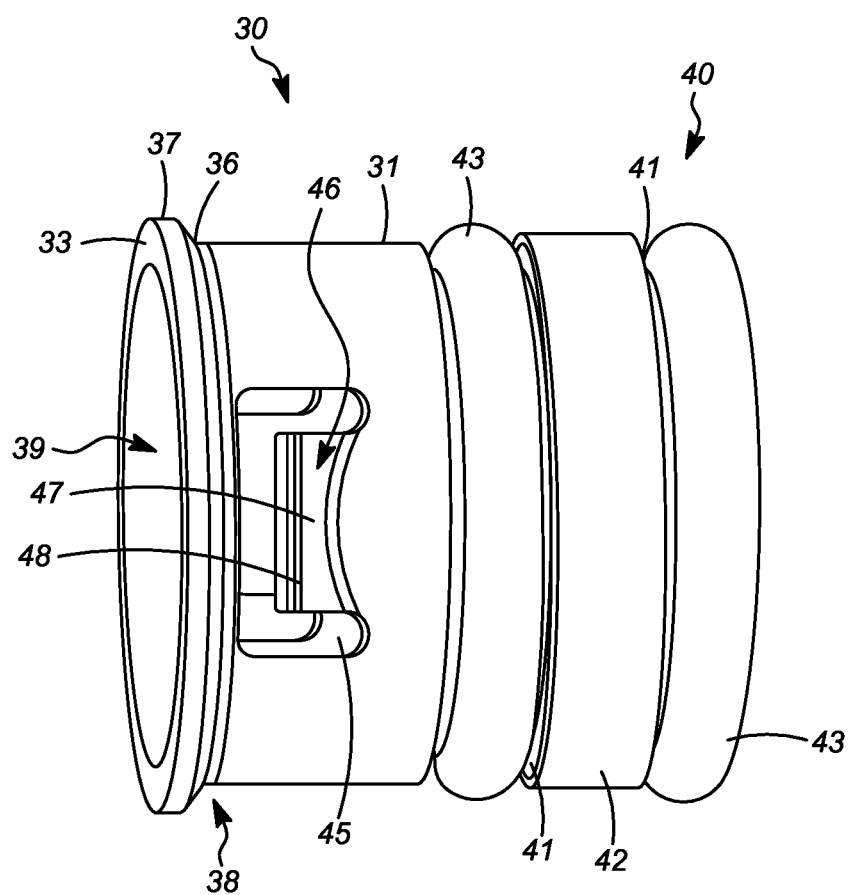
FIG. 3 illustrates an isometric view of a sealing member of the example quick connector in accordance with the present disclosure.

FIGS. 1-3 illustrate an example of a sealing member 30 of the present disclosure and its installation into receptacle body 20. The sealing member 30 has a cylindrical outer diameter that is complementary to a cylindrical inner diameter of cavity 29 at a sealing section 28 of the socket portion 27. As can be seen in FIG. 2, the socket portion 27 is generally D-shaped in configuration and has a socket opening 74 leading into the internal cavity 29. The entrance to the sealing section 28 extends from the annular abutment surface 21 to an annular end stop surface 23 having a cylindrical internal wall 22 therebetween.

As is illustrated in FIG. 3, the sealing member 30 is comprised of a cylindrical body 31 having a receiver opening 39 extending through the sealing member 30. The receiver opening 39 has an inner cylindrical diameter that matches the outer cylindrical diameter of the insertion portion 15 of endform 14. The body 31 has an outer cylindrical diameter that allows the outer surface 32 of body 31 to be housed internally within the sealing section 28. The sealing member 30 further includes an annular flange 37 on a first end 38 of the body 31. The flange 37 extends outward from the body 31 and includes a front planar face 33 and an annular shoulder 36. A second end 40 of the sealing member 30 includes a pair of channels 41 extending about the body 31 separated by a spacer ring 42. The spacer ring 42 has outer diameter that is substantially similar to the diameter of body 31. Inner portions of each channel 41 opens into receiver opening 39. A pair of elastomeric seals, such as for example, O-rings 43 are arranged to be installed in each channel 41. Portions of each O-ring 43 extend through the opening in each channel 41 and into receiver opening 39. The body 31 further includes a pair of windows 45 located in opposition to each other extending through the body 31 to receiver opening 39. An L-shaped sealing member latch 46 extends from each window 45. The sealing member latches 46 include a first leg 47 extending from the body member surface 32 from each window 45 and a second leg 48 extending perpendicularly from the first leg 47, the second leg 48 extending outward from each window 45.

With reference to FIGS. 1-3, the sealing member 30 is installed into socket portion 27 and press-fit into the sealing section 28 by aligning sealing member latches 46 with sealing section openings 24 extending through the sealing section 28 and pushing the sealing member axially into cavity 29 until shoulder 36 rests on abutment surface 21 and the second end 40 contacts stop surface 23. As the sealing member 30 is pushed into the sealing section 28 each second leg 48 of each latch 46 is deflected and urged inward by the abutment surface 21. As can be best seen in FIG. 8, the second leg of latches 46 travel across surface 22 of the sealing section until they reach a respective sealing section opening 24, wherein each second leg 48 is allowed to return to its normal shape and spring outward of opening 24 locking the sealing member 30 in position in the sealing section 28. Each O-ring is elastically deformed between their individual groove 41 and the cavity 29 wall 22 forming a fluid tight seal between the sealing member 30 and the sealing section 28. The sealing member 30 and its elements, except for the O-rings are formed of a rigid material, such as for example, a thermoplastic. The sealing member 30 can be removed from the sealing section 28 by pushing-in sealing member latches 46 away from opening 24 and extracting the sealing member 30 through cavity 29. This can be easily done in the field, allowing for a technician to install other specific sealing members 30 sized to be used with other types and diameters of tube endforms.

Figure 4:
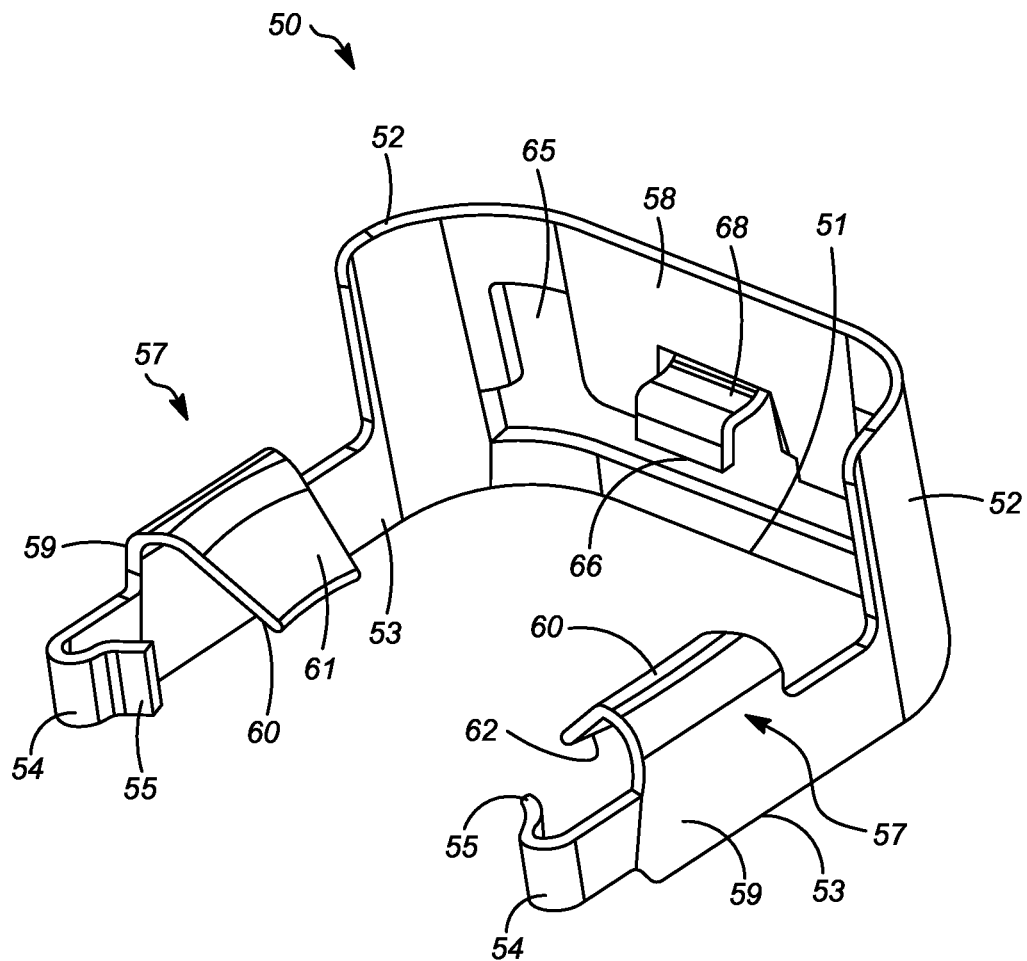
FIG. 4 illustrates an isometric view of a bracket, of the example quick connector in accordance with the present disclosure.

FIGS. 1 and 4 illustrate an example bracket 50 of the present disclosure. The bracket 50 is arranged to capture endform 14 when the endform 14 is installed in the socket portion 27 of the receptacle body 20. The bracket 50 is comprised of a rear bulkhead 58 extending into a pair of curved walls 52. Each wall 52 is located on an opposite side of the bulkhead 58. A pair of legs 53 project outward from a portion of each curved wall 52. In particular, the pair of legs 53 includes one leg 53 projecting from a portion of a first curved wall 52 and another leg 53 projecting from a second curved wall 52 on an opposite end of bulkhead 58 such that the pair of legs 53 are laterally spaced apart. Each leg 53 terminates at a hook-shaped finger 54. Each finger 54 includes an inwardly facing flange member 55. Each leg 53 further includes a spring latch 57 extending from each leg. Each spring latch 57 has a first member 59 extending perpendicularly from a respective leg 53 and second member 60 folded over and oriented at an acute angle from the first member 59. The second member 60 of each spring latch 57 is arranged to allow deflection of the second member 60 toward the first member 59 when a force is applied to a top surface 61 and to resist bending of the second member 60 when a force is applied to a bottom surface 62.

The bracket 50 further includes a lower wall section 51 extending along the back of the bracket 50 in alignment with the bulkhead 58 between the pair of curved walls 52. An opening 66 extends into a pair of recesses 65. The opening 66 is formed between the bulkhead 58 and the wall section 51. Each recess 65 is adapted to receive therethrough a respective arm 82 of the verifier 80 when the verifier ins installed to the bracket 50. A clasping hook 68 extends inward from bulkhead 58 and is arranged to engage a locking notch 88 on the verifier 80. The bracket 50 is preferably formed as a unitary structure from a metal material, such as for example, a spring steel. However, it could also be formed from other resilient materials, such as for example, molded from a thermoplastic that would allow the proper deflection of the second member 60 of spring latches 57.

Figure 6:
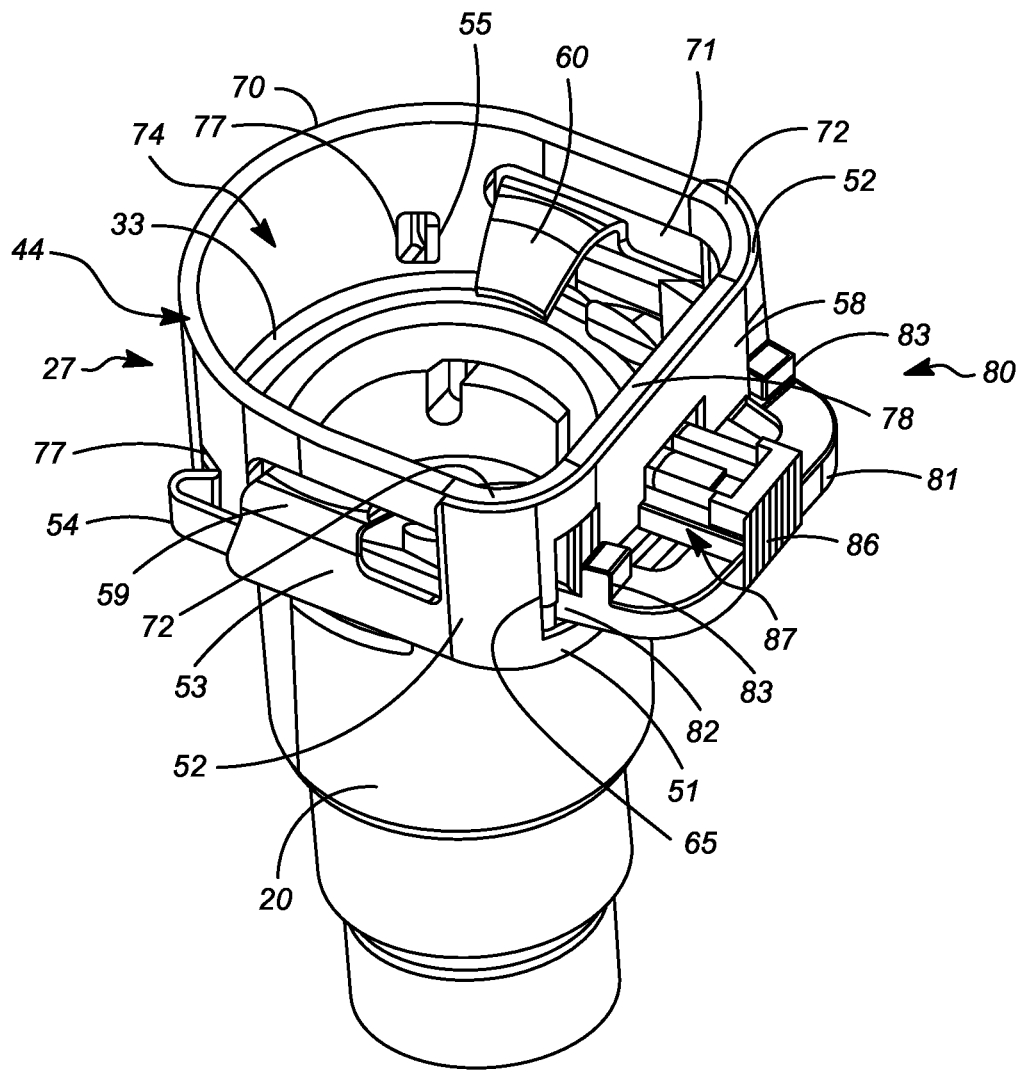
FIG. 6 illustrates an isometric view of the example quick connector receptacle body in an installation ready condition in accordance with the present disclosure.

The bracket 50 is arranged to be installed to an upper section 44 of socket portion 27 after installation of sealing member 30 within the sealing section 28. With renewed reference the upper section 44 of socket portion 27 of the disclosure will be explained. The upper section 44 is generally "D" shaped and includes a peripheral wall 70 extending about the socket opening 74. Wall 70 includes a pair of curved wall sections 72 extending from a bulkhead wall section 78. Curved wall sections 72 and bulkhead wall section 78 have external faces that conform to the internal faces of curved walls 52 and bulkhead 58 respectively, of the bracket 50. Wall 70 includes a pair of wall sections 73 located opposite of the other on either side of the socket opening 74. A pair of latch openings 71 are formed through wall 70 adjacent wall sections 73. A pair of flange member openings 77 extend through wall 70 each located on an opposite end of the wall 70. Each flange member opening 77 is arranged to accept therein a respective flange member 55 of each leg 53 of bracket 50. A pair of verifier recesses 75 extend from each side of a central opening 76 which extend through wall 70 below bulkhead section 58. The pair of verifier recesses 75 and central opening 76 have a general shape and dimension as to conform to recesses 65 and opening 66 respectively of the bracket 50. In combination, recesses 65 and 75 and openings 66 and 76 provide a passthrough to accept the installation of verifier 80 through the bracket 50 and the upper section 44 wall 70 of the socket portion 27. FIG. 6, illustrates the bracket 50 installed in the upper section 44 of the socket portion 27 in an endform accepting position. In the endform accepting position a respective second member 60 extends through a respective opening 71 into the socket opening 74. The bracket 50 is held in the installation ready condition by the grasping a flange members 55 in flange member openings 77.

Figure 5:
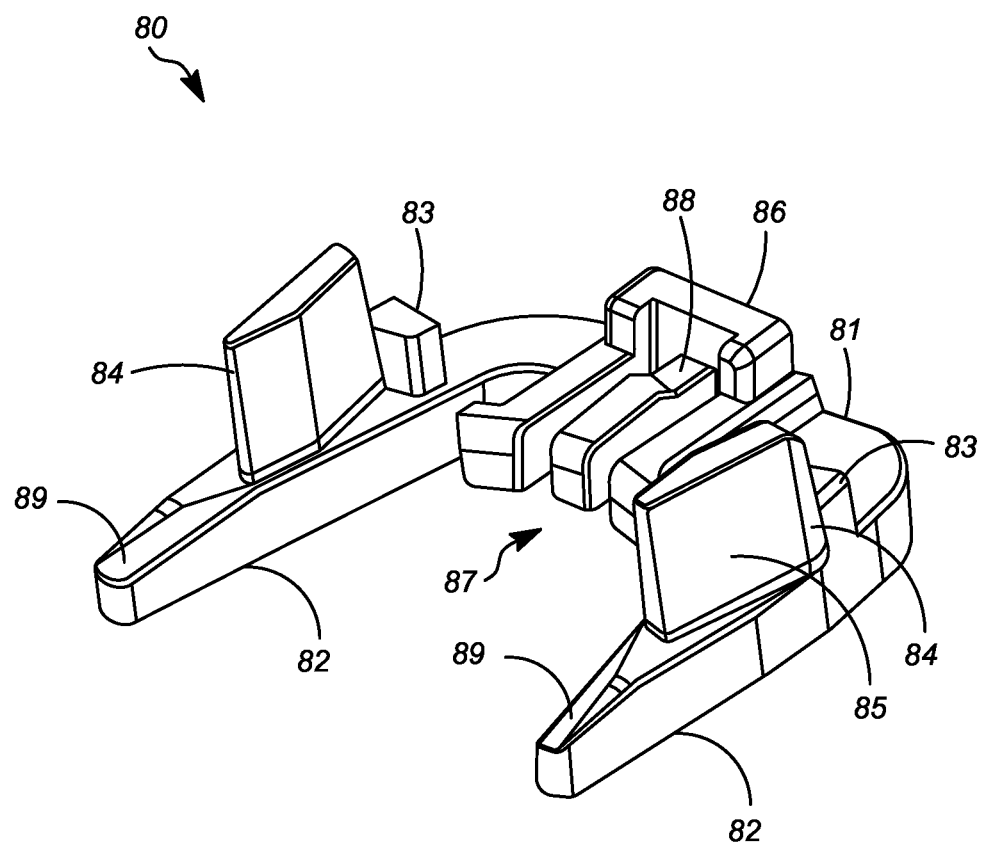
FIG. 5 illustrates an isometric view of a verifier, of the example quick connector in accordance with the present disclosure.

An example verifier 80 of the present disclosure is illustrated in FIG. 5. The verifier 80 includes a crossmember 81 having a pair of arms 82 which project from opposite ends of the crossmember 81. In particular, the pair of arms includes one arm 82 projecting from one end of the crossmember 81 and another arm 82 projecting from the opposite end of the crossmember 81 such that the arms 82 are laterally spaced apart and are identical to the other. Each arm 82 includes a stop member 83 extending perpendicularly from a top surface of each arm and a billboard member 84 located adjacent to each stop member 84. Each billboard member 84 includes a generally planar surface 85 arranged to have verifying indicia, for example a QR code or other distinguishing marks printed or applied on surface 85 to provide a visual or machine readable verification of the proper installation of the endform 14. The verifier 80 crossmember 81 further includes a push surface 86 extending perpendicularly from the crossmember 81 and a set of fixing fingers 87 extending perpendicularly from a top surface of the crossmember 81. The fixing fingers 87 extend from crossmember 81 generally parallel to arms 82. A locking notch 88 is formed on a center finger of the locking fingers 87 adjacent the push surface 86.

Each arm 82 includes a chamfered surface 89 formed on the inner face of each arm 82 that slope radially upward from the inner face of each arm 82. The inner edges of the arms 82 are spaced apart a distance smaller than the outer diameter of the upset 18 formed about endform 14. The outer edges of each arm 82 are generally linear or straight in orientation and arranged to fit within the recesses 65 of the bracket 50 and the recesses 75 of the socket portion 27 upper portion 44. The verifier 80 is formed of a resilient material, preferably molded from a thermoplastic, such that each arm 82 may flex and deflect radially outwardly as the verifier 80 is installed. That is, the chamfered surfaces 89 of each arm 82 travel against an installed upset 18 and arranged to urge each arms 82 laterally outward as arms 82 travel across the upset 18 which will be explained in more detail below.

FIG. 6 illustrates an example embodiment of the present disclosure wherein the quick connector assembly 10 is in an installation ready condition, such as for example, when the quick connector assembly 10 is manufactured and ready to accept within the socket opening 74 an endform 14. In the installation ready condition, the sealing member 30 is installed in sealing section 28, and the bracket 50 and the verifier 80 are installed to the socket portion 27. Particularly, the bracket 50 is installed on the wall 70 of socket portion 27 upper section 44 with a respective second member 60 of the spring latches 57 extending through a respective opening 71. Each second member 60 of each spring latch 57 extends into the socket cavity 74. The bracket 50 is retained in the installation ready condition by the action of a respective flange member 55 grasping a respective flange member opening 77. The verifier 80 has each arm 82 inserted into the socket cavity 74 through a respective recess 65 of the bracket 50. Fixing fingers 87 are partially inserted through opening 66. Opening 66 and recesses 65 are located above wall 51 on the bracket 50 and thereby positions the verifier arms 82 and fixing fingers 87 above the surface 33 of the sealing member 30. The verifier 80 is prevented from being fully inserted into the socket cavity 74 by a front surface of each stop member 83 engaging an edge of bulkhead 58. Additional movement of the verifier 80 into socket cavity 74 would require the each stop member 83 be disengaged from the edge of bulkhead 58 to allow the stop members 83 to enter the socket cavity 74 through their respective recesses 65. This can only be accomplished when the endform 14 is installed in the socket cavity 74.

Figure 7:
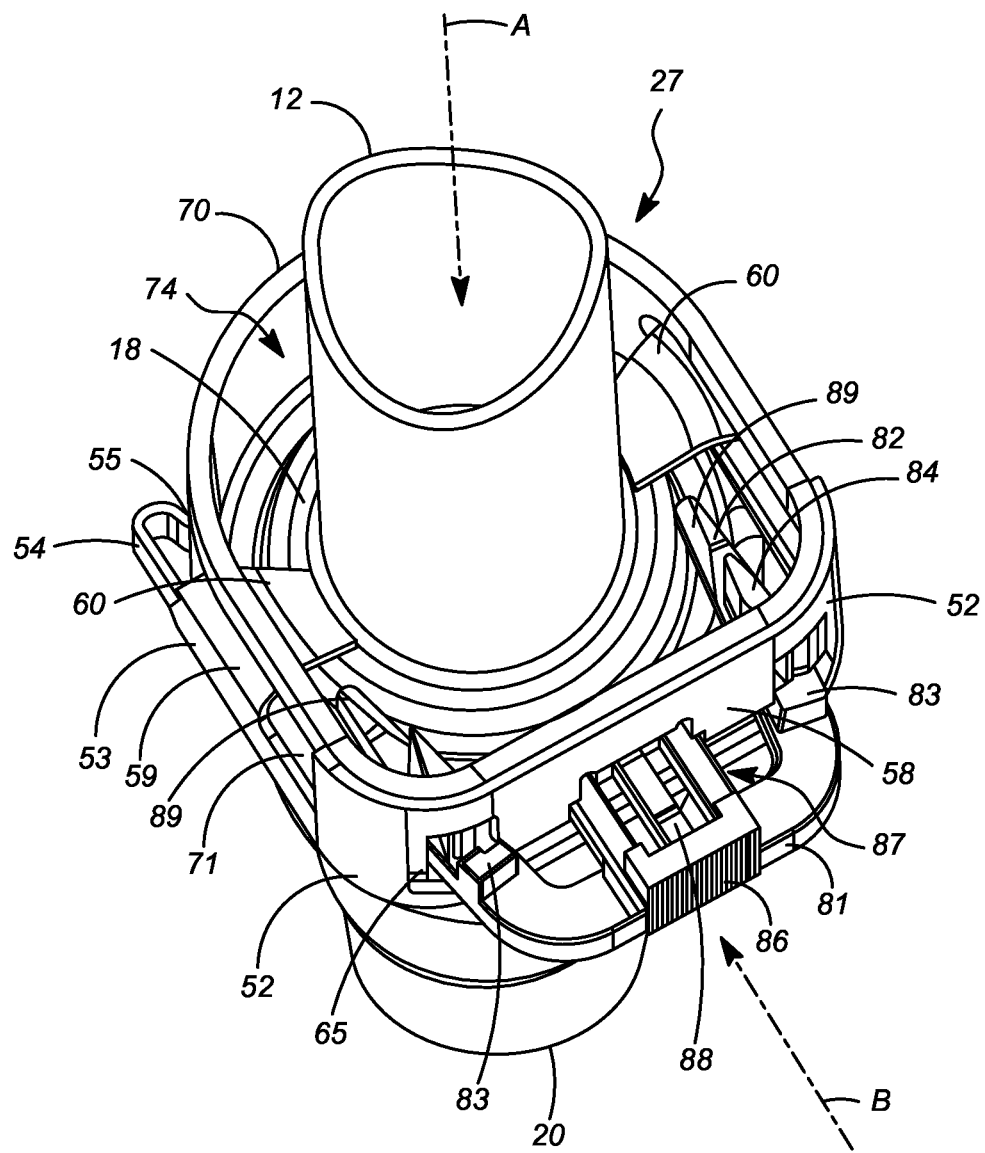
FIG. 7 illustrates an isometric view of the example quick connector receptacle body in an installed condition in accordance with the present disclosure.
Figure 8:
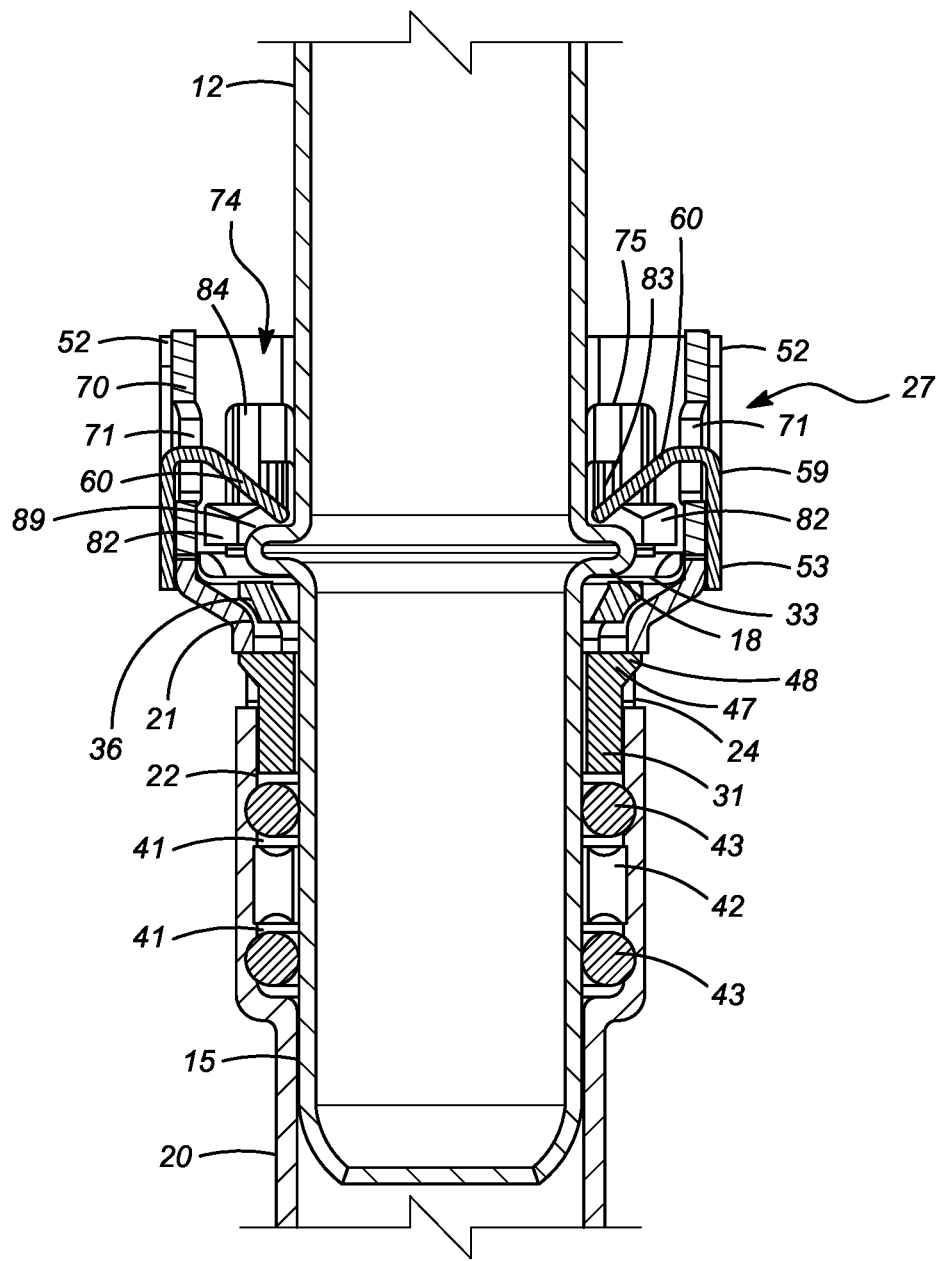
FIG. 8 illustrates a sectional view of FIG. 7 of the example quick connector in the installed condition in accordance with the present disclosure.

With reference to FIGS. 7 and 8 the installation of the endform 14 into socket portion 27 will be described. The insertion portion 15 of the endform 14 is aligned with and inserted into receiver opening 39 of the sealing member 30. As the insertion portion 15 is inserted into the receiver opening 39 the upset 18 enters the socket cavity 74 and contacts the top surface 61 of each second member 60 of the spring latches 57. A continued applied force in axial direction A will cause deflection of each second member 60 inwardly toward the first member 59 by the upset 18 pushing each second member 60 away from the upset 18. Once the upset 18 moves beyond each of the second members 60 and rests on the surface 33, each of the second members 60 returns to its relaxed position capturing the upset 18 between the sealing member surface 33 and a bottom surface 62 of each spring latch second member 60, as is best seen in FIG. 8. The endform 14 is now in an installed condition and retained within socket portion 27. In the installed condition, the insertion portion 15 of endform 14 is installed within receiver opening 39 of the sealing member 30 making a fluid tight seal between the endform 14 and the sealing member 30 by elastically deforming the O-rings 43 against the insertion portion 15 that extend into receiver opening 39 from the channel 41 openings.

Figure 9:
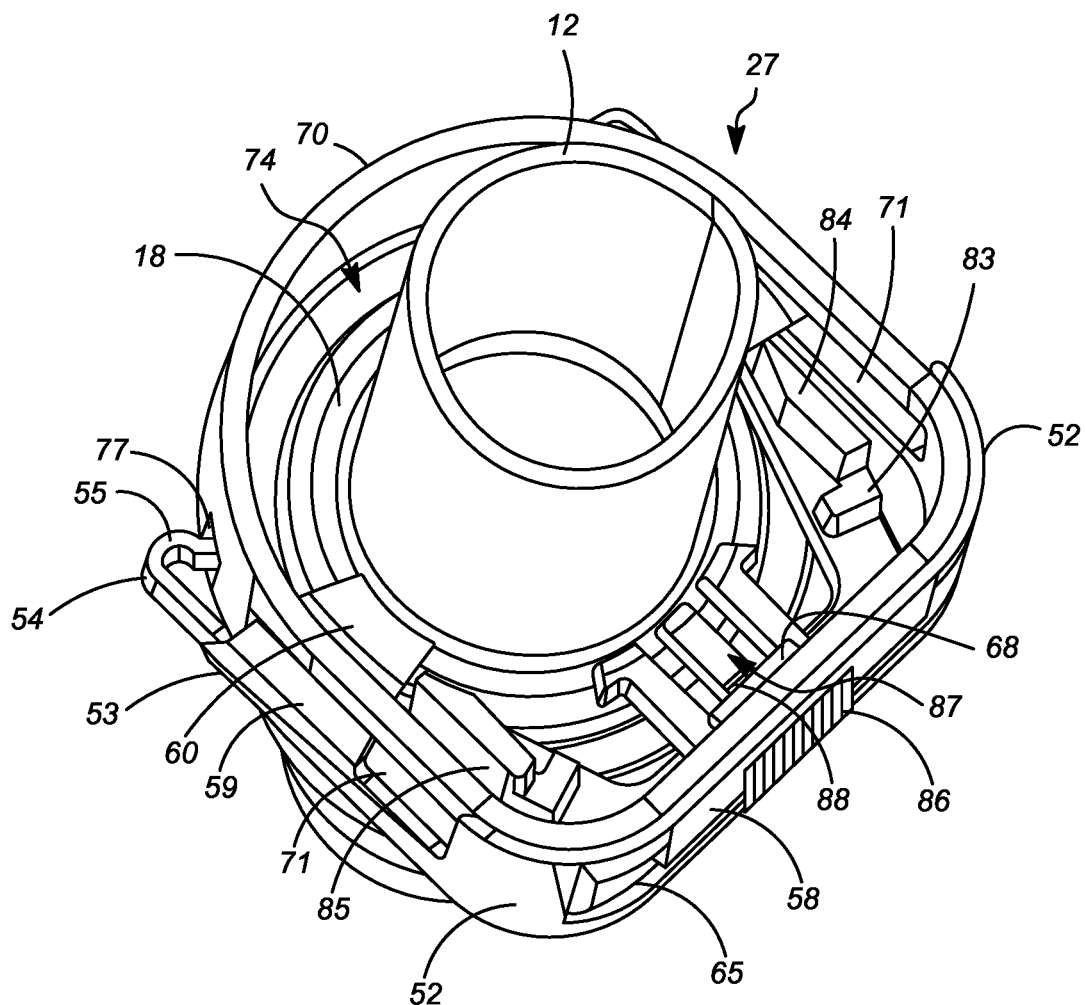
FIG. 9 illustrates an isometric view of the example quick connector in the verification condition, in accordance with the present disclosure.

As can be seen in FIG. 7, in the installed condition, chamfered surface 89 of each arm 82 aligns with an outer edge of upset 18. Applying a force to push surface 86 in direction B will cause each arm of the verifier 80 to travel along the exterior surface of the upset 18. Each arm 82, will be deflected outwardly toward the wall 70 as it travels along the upset 18 exterior surface. The outward deflection will disengage each stop member 83 from the edge of the bulkhead 58 allowing each stop member 83 to enter the socket cavity 74 via a respective recess 65 and 75. With continued forward pressure on push surface 86, the clasping hook 68 on the bracket 50 falls into and is captured by the notch 88, which stops any further forward movement of the verifier 80 into the socket cavity 74. When the verifier 80 is fully inserted into the socket cavity 74 push surface 86 aligns with bulkhead 58 and the forward portion of each arm 82 locates behind a respective second member 60, over the upset 18, as is shown in FIG. 9. The placement of the forward portion of each arm 82 behind a respective second member 60 does not allow the second member 60 to flex outwardly towards wall 70, guarding against any inadvertent unlatching of the second members 60 from the upset 18. Additionally, the placement of the fixing fingers 87 over the upset 18 enhances the hold of the upset 18, assuring that the endform 14 is held firmly in the socket portion 27. With the capture of the clasping hook 68 by the notch 88, the verifier 80 now becomes locked to bracket 50. Any subsequent movement of the bracket 50, such as for example, movement of the bracket 50 to unlatch the endform 14 from the receptacle body 20 will now also move the verifier 80.

Figure 10:
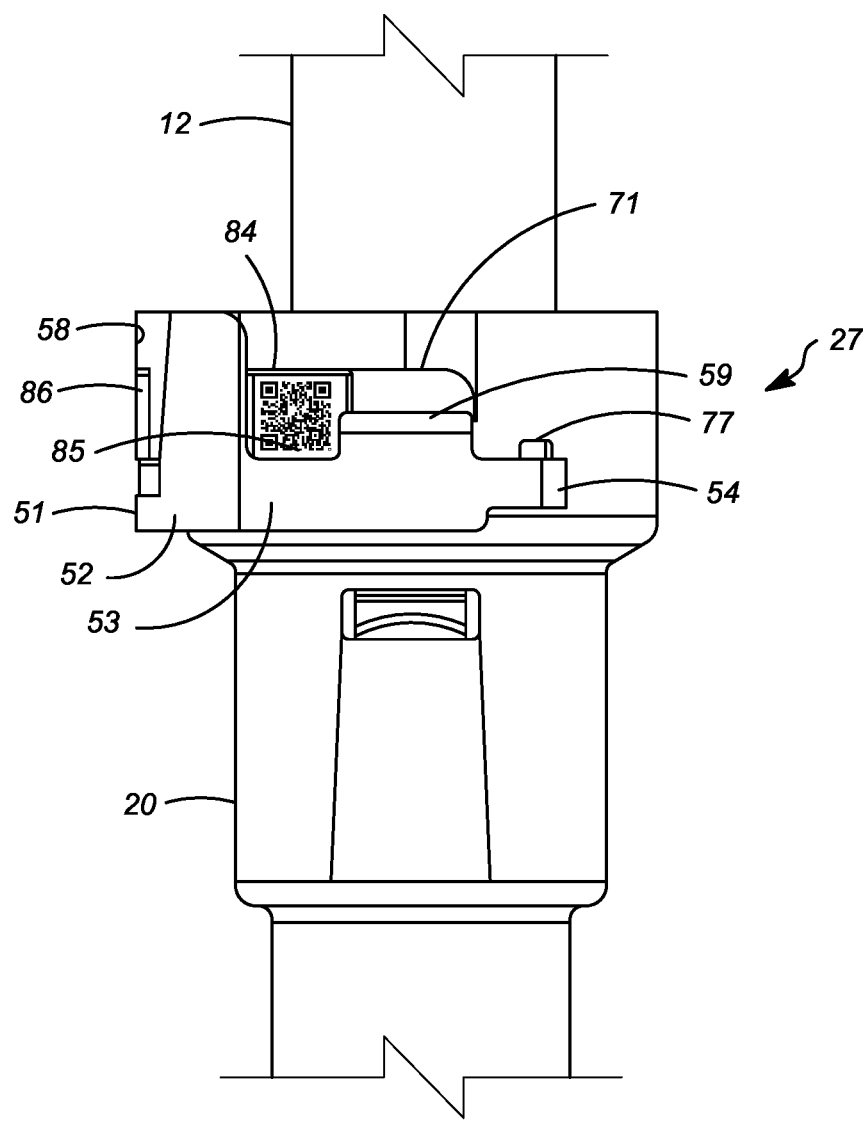
FIG. 10 illustrates a side elevational view of the example quick connector of FIG. 9, illustrating a verification feature in accordance with the present disclosure.

Once the verifier 80 is fully installed within socket portion 27 the verifier is now in a verification condition. In the verification condition, each billboard member 84 surface 85 becomes visible through a respective opening 71 of the socket portion 27. For example, as shown in FIG. 10, a QR code applied on each surface 85 becomes visible through a respective opening 71. The QR code can be read by a hand held visual scanner allowing for machine scanning and recording of the positive engagement of the endform 14 to the receptacle body 20. It will be appreciated by those skilled in the art that other forms of code or indicia may be printed on surface 85 to provide a visible indication of a positive engagement of the endform 14 to the receptacle body 20.

Figure 11:
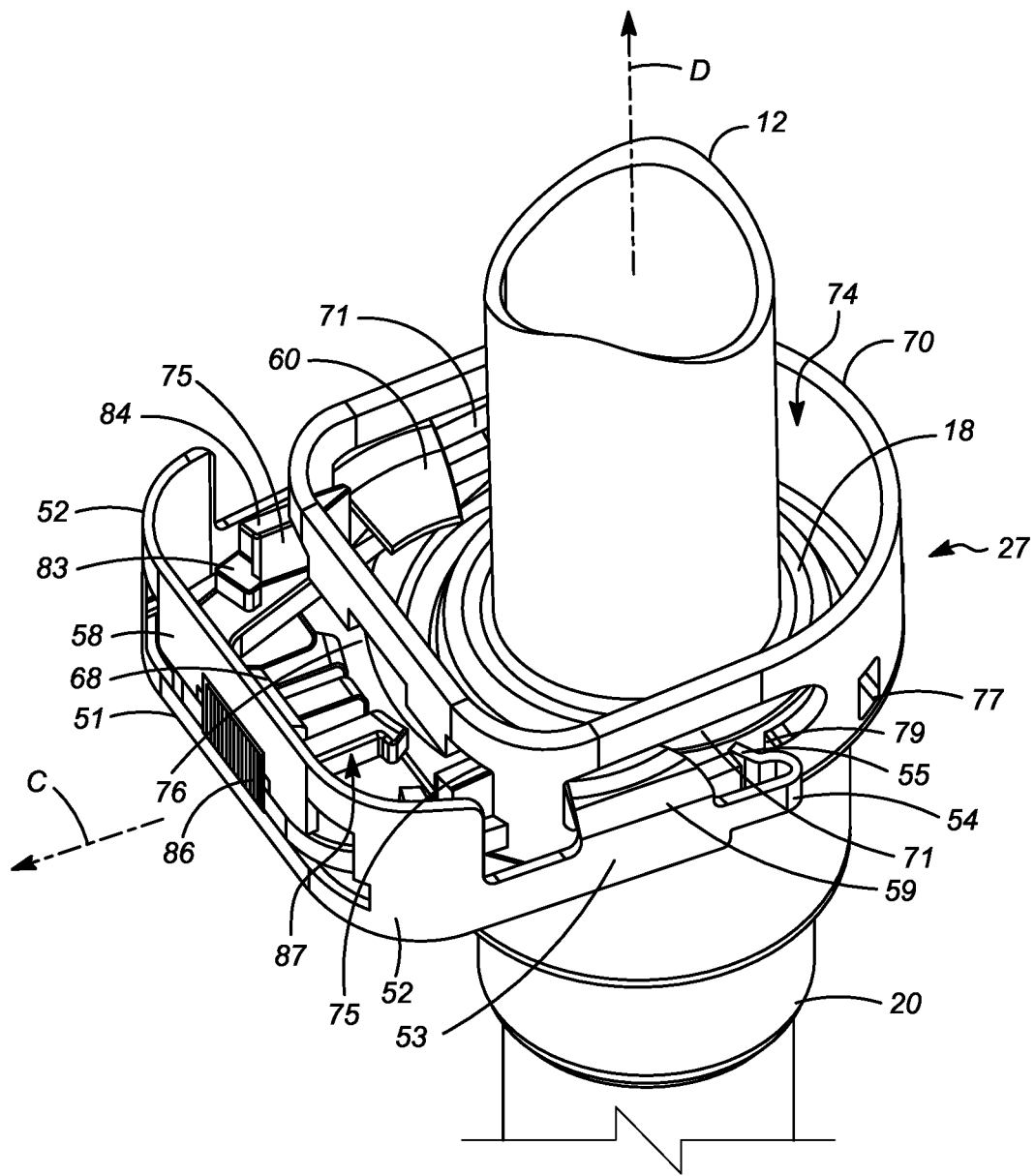
FIG. 11 illustrates an isometric view of the example quick connector in a serviceable condition in accordance with the present disclosure.

The endform 14 can be removed from the receptacle body 20 for servicing or replacement. To remove the endform 14 from the socket portion 27 of the receptacle body 20, each flange member 55 on each bracket arm 53 is manually removed from a respective flange member opening 77 and the bracket 50 moved backward in direction C as shown in FIG. 11, thereby placing the quick connector assembly 10 into a serviceable condition. In the serviceable condition, the bulkhead 58 and the curved walls 52 of bracket 50 are pulled back from the socket portion 27 curved wall sections 72 until each flange member 55 enters into a respective retainer notch 79 and arresting any further backward movement of the bracket 50. With flange members 55 in retainer notches 79, each second member 60 of each spring latch 57 is moved to a position where each member 60 is not located over upset 18. Since the verifier 80 now moves along with the bracket 50, the backward movement of the bracket 50 also moves fixing fingers 87 into a position where the fixing fingers 87 are not located over upset 18. The endform 14 can now be removed from the receptacle body 20 by pulling the endform 14 from socket portion 27 in direction D.

After servicing, the endform 14 can be reinstalled into socket portion 27 and the bracket 50 repositioned to capture the endform 14. Reapplying a force to push surface 86 in direction B, disengages flange members 55 from retainer notches 79 moving the bracket 50 back into the installed condition and engage flange members 55 to respective flange member openings 77 of the installed condition as shown in FIG. 9. Since verifier 80 also now moves in concert with the bracket 50 movement of the bracket 80 into the installed condition will also move the verifier 80 into the verification condition as shown in FIG. 10.

It will be seen that the quick connector assembly described herein provides the benefits of only requiring access from one side, for example, top, bottom, left or right in order to operate the components of the connector (e.g., retainer and verifier) and to connect the fluid tubes together. Further, since the quick connector assembly of the present disclosure can be coupled to male and female components in any radial direction, the quick connector assembly can be oriented to provide the most convenient access for an installer or user. In this way, packaging of the quick connector assembly is improved, and routing of fluid lines is made more robust and variable in a variety of different environments. The quick connector assembly has numerous applications where a fluid-tight, but serviceable connection is desired. Within the industry a serviceable connection is a connection were the fluid carrying components of a quick connector can be disconnected from each other for the purposes of maintenance or the servicing of components of the quick connector assembly.

While the following is described in conjunction with specific embodiments, it will be understood that this description is intended to illustrate and not limit the scope of the preceding description and the appended claims. Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

What is claimed is:

1. A quick connector assembly comprising:
a receptacle body having a cavity extending through the receptacle body to a stem portion connected to a second fluid tube;
a sealing section located within the cavity;
a socket portion having a wall extending from the sealing section bordering a socket opening in alignment with the cavity and a pair of latch openings extending through a portion of the wall into the socket opening;
a sealing member having a receiver opening installed in the sealing section, the receiver opening in alignment with the socket opening and the stem portion;

a bracket installed on the wall including a pair of spring latches each spring latch extending through a respective one of the pair of the latch openings into the socket opening;

a verifier including a pair of verifier arms extending from either side of a push surface and fixing fingers extending from the push surface between the pair of verifier arms, wherein the fixing fingers and each verifier arm are installed through a recess in the wall into the socket opening; and a first fluid tube having an insertion portion and a raised upset, the insertion portion placed through the socket opening into the receiver opening making a fluid connection to the second fluid tube and causing the upset to be captured by each spring latch and by the fixing fingers when each verifier arm extends into the socket cavity on either side of the upset.

2. The quick connector assembly of claim 1, wherein the assembly further comprises:

a stop member extending from each verifier arm, each stop member engaging the bracket preventing each verifier arm from fully extending into the socket opening.

3. The quick connector assembly of claim 2, wherein upon capture of the first fluid tube upset by each of the spring latches, a force applied to the verifier push surface causes each verifier arm to travel along the first fluid tube upset disengaging each stop member from the bracket and allowing each verifier arm to extend fully into the socket cavity on either side of the upset and below a respective spring latch.

4. The quick connector assembly of claim 3, wherein each verifier arm includes a billboard surface having verifier symbols applied on the billboard surface and, wherein each billboard surface is visible through a respective latch opening when each verifier arm extends fully into the socket cavity, verifying the coupling of the first fluid tube to the receptacle body.

5. The quick connector assembly of claim 4, wherein the verifier symbols are a machine readable code scannable by a scanning device.

6. The quick connector assembly of claim 5, wherein the bracket further includes a pair of flange members that engage a pair of flange member openings extending through the socket portion wall, when the bracket is installed on the socket portion.

7. The quick connector assembly of claim 5, wherein each latch opening further includes a retainer notch and wherein the bracket flange members are disengaged from the flange member openings allowing the bracket and verifier to move causing each spring latch and the fixing fingers to slide away from the first fluid tube upset the until each flange member enters a respective retainer notch locating each spring latch in a position to allow the removal of the first fluid tube from the receptacle body.

8. The quick connector assembly of claim 1, wherein the sealing section further includes a pair of sealing section windows extending through the sealing section from the cavity to the exterior of the receptacle body and the sealing member includes a pair of sealing member latches each latch engaging a respective sealing section window retaining the sealing member to the sealing section.

9. The quick connector assembly of claim 8, wherein each sealing member latch is accessible on the exterior of the receptacle body to disengage each sealing member latch from its respective sealing section window and remove the sealing member from the sealing section through the socket opening.

10. A process for forming a coupling in a fluid line between a first and a second fluid tube, the process comprising:

coupling the second fluid tube to a stem of a receptacle body having a cavity extending through the receptacle body;

forming a sealing section within the cavity and installing a sealing member having a receiver opening in the sealing section, the receiver opening in alignment with the socket opening and the stem portion;

forming a socket portion extending from the sealing section having a wall bordering a socket opening in alignment with the receiver opening and a pair of latch openings extending through a portion of the wall into the socket opening;

installing a bracket on the wall including a pair of spring latches, each spring latch extending through a respective one of the pair of the latch openings into the socket opening;

installing a verifier having a push surface and fixing fingers between a pair of verifier arms through a recess in the socket portion wall and into the socket opening;

forming an endform on the first fluid tube including an insertion portion and a raised upset; and inserting the insertion portion through the socket opening into the receiver opening making a fluid coupling to the second fluid tube and causing the upset to be captured by each spring latch and by the fixing fingers.

11. The process of claim 10, wherein the process further comprises:

and placing the verifier into an installation ready condition by installing each verifier arm into the socket opening until a stop member extending from each verifier arm engages the bracket preventing each verifier arm from fully extending into the socket opening.

12. The process of claim 11, wherein the process further comprises:

placing the verifier in an installed condition upon capture of the first fluid tube upset by each spring latch, by applying a force to the verifier push surface causing each verifier arm to travel along the first fluid tube upset and disengage each stop member from the bracket, allowing each verifier arm to extend fully into the socket cavity on either side of the upset and below a respective spring latch.

13. The process of claim 12, wherein each verifier arm includes a billboard surface having verifier symbols applied on the billboard surface, the process further comprising:

revealing each billboard surface through a respective latch opening when the verifier is placed in the installed condition; and verifying the coupling of the first fluid tube to the receptacle body.

14. The process of claim 13, wherein the verifier symbols are a machine readable code scannable by a scanning device.

15. The process of claim 14, wherein the bracket further includes a pair of flange members and the socket portion further includes a pair of flange member openings extending through the socket portion wall, the process further comprising:

grasping a flange member opening by a respective flange member when the bracket is installed on the socket portion.

16. The process of claim 14, wherein each latch opening further includes a retainer notch, the process further comprising:

disengaging the pair of flange members from the pair of flange member openings;

moving the bracket and verifier to cause each spring latch and the fixing fingers to slide away from the first fluid tube upset until each flange member enters a respective retainer notch; and removing the first fluid tube from the receptacle body.

17. The process of claim 10, wherein the sealing section further includes a pair of sealing section openings extending through the sealing section from the cavity to the exterior of the receptacle body and the sealing member includes a pair of sealing member latches, the process further comprising:

retaining the sealing member to the sealing section by engaging a respective sealing member latch to a respective sealing section opening.

18. The process of claim 17, wherein each latch is accessible on the exterior of the receptacle body allowing disengagement of each sealing member latch from its respective sealing member opening and removal of the sealing member from the sealing section through the socket opening.

\* \* \* \* \*